June 29, 1926.
J. O. SABIN
1,590,856
POULTRY ROOST
Filed August 31, 1925
2 Sheets-Sheet 1
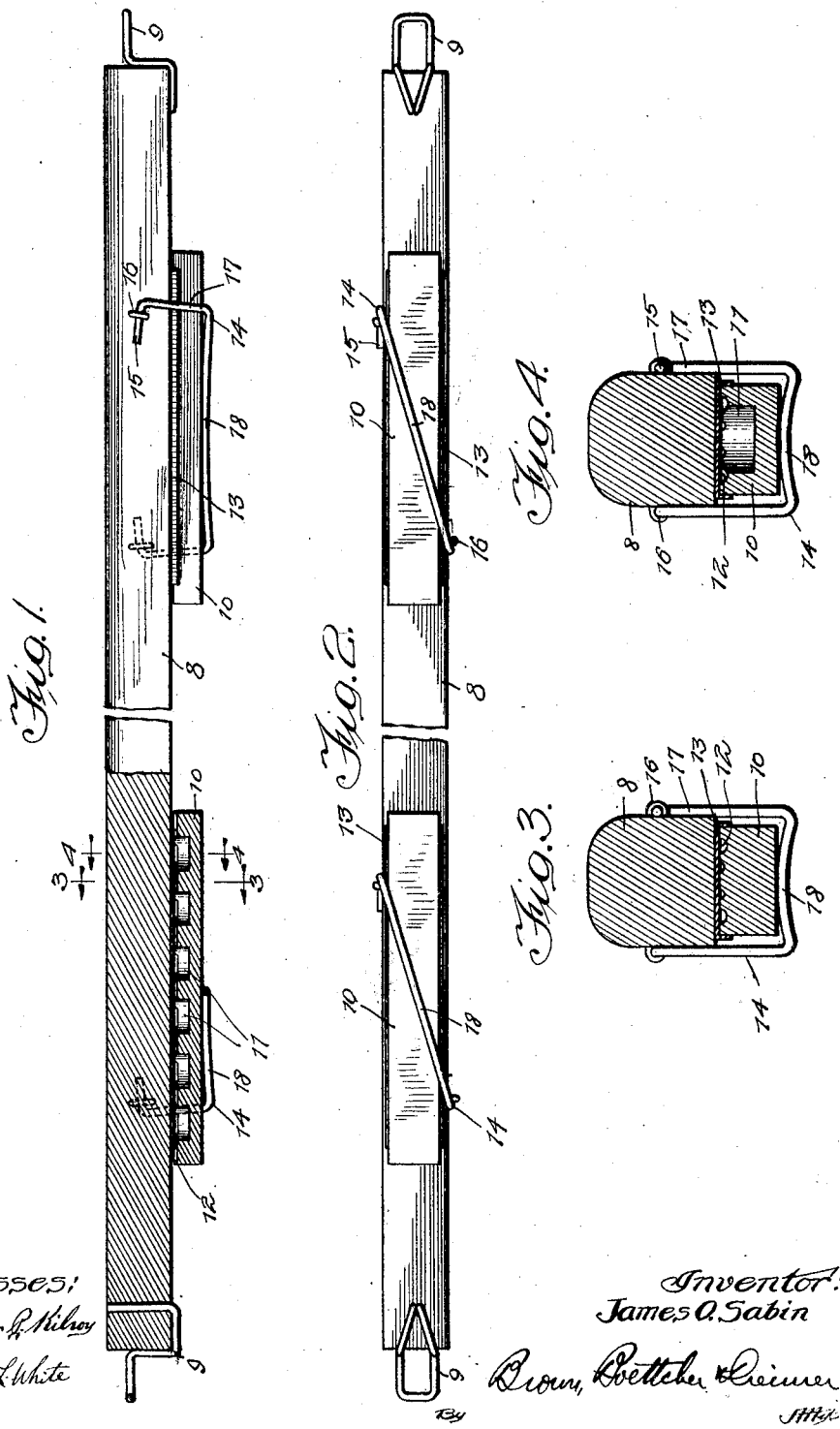
Witnesses:
William G. Kilroy
Harry R. L. White
Inventor:
James O. Sabin June 29, 1926.

J. O. SABIN

POULTRY ROOST

Filed August 31, 1925

Witnesses:
William P. Kilroy
Harry R. L. White

Inventor
James O. Sabin

By Brown, Boettcher & Dienner

Patented June 29, 1926.

1,590,856

UNITED STATES PATENT OFFICE.

JAMES O. SABIN, OF MUSCATINE, IOWA.

POULTRY ROOST.

Application filed August 31, 1925. Serial No. 53,452.

My invention relates to poultry roosts, more particularly to those embodying a trap or traps for lice, mites, and the like, and has to do with a specific form of trap and with means for holding the trap to the roost.

In the accompanying drawings,

Figure 1 shows the assembled roost in elevation, being broken to show that it may be of any length, and part being shown in section to illustrate interior construction;

Figure 2 is an underside view thereof;

Figure 3 is a sectional view taken on the plane of the line 3—3 of Figure 1 and looking in the direction indicated by the arrows;

Figure 4 is a sectional view taken on the plane of the line 4—4 of Figure 1 and looking in the direction indicated by the arrows;

Figure 5:
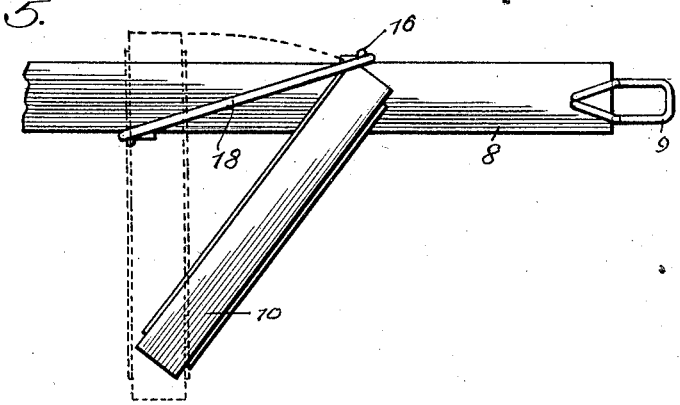
Figures 5 and 6 are partial underside views showing the manner of applying the trap to the roost proper.

The roost proper is shown at 8. It is simply a strip, preferably of wood, of rectangular cross section except for the top which is preferably rounded, as shown. At each end a wire lug hook 9 is provided, to facilitate the mounting of the roost on suitable side supports.

The main body of the trap is shown at 10, also preferably of wood. In the case of short roosts, one trap is provided at the center, and in the case of longer ones, a trap is provided near each end, as illustrated.

The trap body 10 is provided with a series of cylindrical wells 11, 11, drilled in or otherwise formed from the top, and the top surface is provided with a plurality of longitudinal grooves, 12, 12, which communicate with the outside and with the wells. A cover 13, preferably of sheet metal, and U-shaped in cross section, fits snugly over the top of the trap body, clamping on the upper margins of the sides.

A stiff wire sling 14 is provided on the roost to hold the trap thereto. Its hooked ends 15 are secured to the respective sides of the roost by means of staples 16, 16, and its downwardly extending members 17, 17 extend directly downwardly, the intermediate member 18 extending diagonally across the bottom of the roost and being spaced from the bottom to receive the covered trap. It is slightly bowed, as shown.

Figure 6:
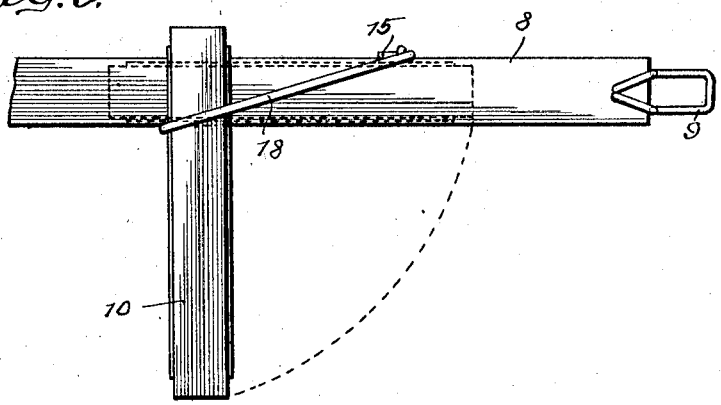
Figure 7:
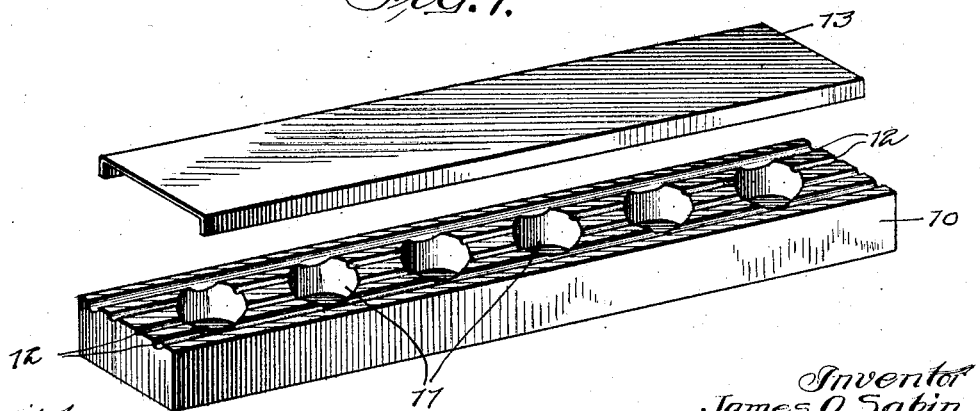
Figure 7 is a view showing the trap itself in perspective with the cover lifted therefrom.

In applying the trap to the roost, it is held in oblique position, and the end thereof is inserted between the planar bottom of the roost and the member 18 near one end of the latter, as shown in full lines in Figure 5. It is then swung into a right angle position, as shown in dotted lines in that figure. Then, as shown in Figure 6, it is swung around the vertical member 17 (at the opposite end), as a fulcrum, into final position parallel to the roost. This procedure brings the trap into proper position and effects its being tightly clamped in place by the pressure of the sling.

It is important that the trap be tightly held in place in such position, entirely within the area of the bottom of the roost, and that it be so held by means which do not provide corners and crevices where lice and mites may lodge and lay eggs, and also that it be possible to apply and remove the trap quickly and with one hand.

Experience has shown that the mites and lice will enter the dark recesses of the trap and then the trap may be removed from time to time to be cleaned and restored.

I claim:—

1. In a poultry roost, a bar with a planar bottom, a U-shape sling of spring material having its ends permanently fastened to the opposite sides of said bar and comprising downwardly extending portions and a midportion extending diagonally across the bottom of said bar, and a trap comprising a block having recesses therein and a cover thereon clamped between said diagonal portion of said bar and said bottom and lying entirely within the area of said bottom.

2. In a poultry roost, a bar with a planar bottom, a U-shape sling of spring material having its ends permanently fastened to the opposite sides of said bar and comprising downwardly extending portions and a midportion extending diagonally across the bottom of said bar, and a trap comprising a block having recesses therein and a cover thereon clamped between said diagonal portion of said bar and said bottom and lying entirely within the area of said bottom, said diagonally extending portion being bowed upwardly whereby to localize its pressure engagement with the trap at a point intermediate the trap side edges whereby to prevent canting.

In witness whereof, I hereunto subscribe my name this 26 day of August, 1925.

JAMES O. SABIN.